United States Patent Office 2,783,223
Patented Feb. 26, 1957

2,783,223

TRISAZO DYESTUFFS OF THE STILBENE SERIES

August Schweizer, Muttenz Basel-Land, near Basel, Switzerland, assignor, by mesne assignments, to Saul & Co., Newark, N. J., as nominee of Fidelity Union Trust Company No Drawing. Application August 23, 1954,
Serial No. 451,685

Claims priority, application Switzerland August 27, 1953

6 Claims. (Cl. 260—145)

The present invention relates to trisazo dyestuffs of the stilbene series.

According to this invention, valuable trisazo dyestuffs of the stilbene series are obtained when one mol of the diazo compound of an aminomonoazo dyestuff of the formula

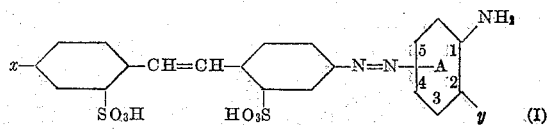

wherein $x$ stands for a nitro, —NH-acyl or naphthylene-triazole group, and $y$ stands for a group which enables metal complex formation to take place, and wherein nucleus A may carry additional substituents such as are conventional in azo dyestuffs (e. g. alkyl groups, alkoxy groups, acylamino groups), the —N=N— group being in one of the positions 4 or 5 of the said nucleus, is coupled with one mol of a monoazo dyestuff of the formula

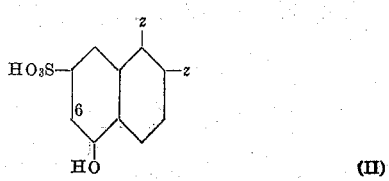

or with a metal complex compound thereof, the coupling taking place in the indicated 6-position, one $z$—in Formula II—being OH and the other $z$ standing for —N=N—R, wherein R is a radical of the benzene or naphthalene series which contains a metal complex forming group in ortho-position to the —N=N— group, and then treating the resultant trisazo dyestuff in substance or on the fiber with a metal-yielding agent.

As aforeindicated, $x$—in Formula I—may represent, in addition to NO₂ and NH-acyl, also a naphthylene-triazole radical, the naphthalene radical being connected in 1,2-position with the triazole ring and, if desired, containing additional substituents, preferably those which have a water-solubilizing action, e. g. sulfonic acid groups. The term "acyl" refers primarily to acyl groups derived from low molecular aliphatic carboxylic acids, such for example as formic acid, acetic acid, propionic acid, butyric acid and isobutyric acid, or from dicarboxylic acids, e. g. the —CO.COOH,

—CO—CH₂—COOH and —CO—CH=CH—COOH groups. Other valuable acyls are the acyl groups derived from aromatic monocarboxylic acids, such for example as benzoic acid, 3-nitrobenzene-1-carboxylic acid or 4-nitrobenzene-1-carboxylic acid, or the acyl groups derived from benzene-1,2-, 1,3- and 1,4-dicarboxylic acids wherein the carboxyl groups are free or esterified, or the acyl groups derived from 1-carboxybenzene-4-sulfonic acid and 1-carboxybenzene-2,4-disulfonic acid, the connection to —NH— being through the carboxyl group. The term "NH-acyl" can, however, also represent the radical of a carbaminic acid, e. g. the —NH—COO—CH₃,

—NH—COO—C₂H₅ or —NH—COO—C₂H₄—OC₂H₅ radicals.

Groups $y$ which are capable of metal complex formation are —COOH, —OCH₃ or —OC₂H₅.

Illustrative of the additional substituents which may be carried by nucleus A are methyl, methoxy, ethoxy, acetylamino, etc.

The radical R of the benzene or naphthalene series which, according to Formula II, is connected to the 1,5- or 2,5-dihydroxynaphthalene-7-sulfonic acid residue by means of an azo group, carries an ortho-position to the said azo group a group which is capable of metal complex formation. Such groups are, for example, —OH, —COOH, —OCH₃ and —OC₂H₅. The radical R may also contain additional substituents, such for example as halogen atoms (e. g. chlorine), alkyl groups (e. g. methyl), alkoxy groups (e. g. methoxy, ethoxy), free or esterified carboxylic acid groups (e. g. —COO.CH₃, —COO.C₂H₅), sulfonic acid groups, alkylsulfonyl groups (e. g. —SO₂—CH₃), sulfonic acid amide groups and derivatives thereof substituted at the nitrogen atom by alkyl, cycloalkyl, aralkyl, aryl or acyl (e. g. —SO₂.NH.CH₃, —SO₂.NH.C₂H₄.OCH₃), nitro groups, amino groups, and amino groups which are substituted by alkyl, cycloalkyl, aralkyl, aryl or acyl (e. g. —NH.CH₃, —NH.C₆H₅).

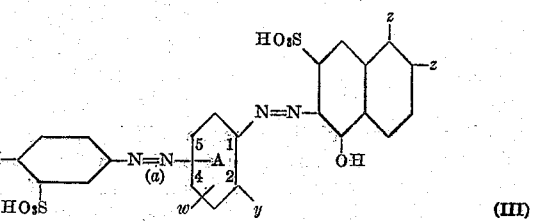

The trisazo dyestuffs according to the present invention correspond in the metal-free state to the formula wherein $x$, $y$ and $z$ have the precedingly-recited significances, wherein the —N=N— group designated by ($a$) is in the 4- or 5-position of nucleus A, and wherein $w$ stands for H, lower alkyl, lower alkoxy or acylamino.

The aminoazo dyestuffs of Formula I, used as diazo components, may be prepared for example by coupling diazotized 4-nitro-, 4-acylamino- or 4-naphthylenetri-azole-4'-aminostilbene-2,2'-disulfonic acid with primary amines of the benzene series which couple in para-position to the amino group and which contain, in ortho-position to the amino group, a group which is capable of metal complex formation. It is frequently advantageous to employ these amines in the form of their ω-methanesulfonic acid derivatives; the ω-methanesulfonic acid group is split off again by saponification, following the coupling. Those aminomonoazo dyestuffs, wherein x stands for nitro or for the naphthylenetriazole group, may in part also be prepared by condensing 4,4'-dinitro- or 4-naphthylenetriazole-4'-nitrostilbene-2,2'-disulfonic acid with 1,3- or 1,4-diamino compounds of the benzene series in aqueous-caustic alkaline medium.

Aminomonoazo dyestuffs of Formula I, wherein the azo group is in 5-position of the nucleus A and wherein y stands for an alkoxy group, are prepared for example by coupling diazotized 4-nitro- or 4-naphthylenetriazole-4'-aminostilbene-2,2'-disulfonic acid with 2-acetylamino-1-hydroxybenzene, and alkylating the hydroxy group and splitting off the acetyl group.

The monoazo dyestuffs of Formula II, used for coupling, are described, on the one hand, in German Patents Nos. 571,859 and 807,289 and, on the other hand, in Swiss Patents Nos. 278,942 and 281,986.

The diazotization of the aminomonoazo dyestuffs of Formula I is advantageously carried out in indirect manner. The diazo compound attaches to the azo component in the 6-position of the monoazo dyestuff of Formula II. This coupling is advantageously carried out in alkaline solution, optionally in the presence of organic bases, such for example as pyridine, pyridine base mixture, or quinoline. In this connection, the azo components may be present in metal-free form or as metal complex compounds.

A series of trisazo dyestuffs of Formula III, wherein x represents a naphthylenetriazole radical, can be prepared from trisazo dyestuffs of Formula III wherein x stands for NO₂ or NH-acyl and which contain no further amino, nitro or acylamino groups than those mentioned, by reducing the nitro group to the amino group or saponifying the NH-acyl group to the amino group, diazotizing the thus-obtained aminotrisazo compounds, coupling with a 1- or 2-aminonaphthalene which couples in ortho-position to the amino group and which may contain additional substituents, particularly water-solubilizing groups, and oxidizing the ortho-amino-azo grouping in the resultant tetrakisazo compound to the triazole group before or simultaneously with the metallization in substance.

The metal-free or only partly metallized trisazo dyestuffs dye cotton and fibers of regenerated cellulose in reddish blue, gray, brown to olive-green shades. The dyeings, metallized on the fiber, e. g. coppered, are fast to light and to washing.

The obtained trisazo dyestuffs can also, according to this invention, be converted in substance into their complex compounds containing one or two atoms of metal. Suitable for this purpose as metal-yielding agents are for example copper and nickel compounds. The coppering, for example, can be carried out according to any of the various methods known from the literature, as for instance by heating the deystuffs with copper salts in weakly acid to alkaline medium, if desired under pressure and/or in the presence of ammonia and/or organic bases, or in a fusion of alkali salts of low molecular aliphatic monocarboxylic acids. Where one of the groups which enables the formation of a metal complex is an alkoxy group, the metallization takes place with splitting of this group.

The metal-containing trisazo dyestuffs possess an excellent affinity for cotton and fibers of regenerated cellulose. They dye these fibers in light-fast and wash-fast reddish blue, gray, brown to olive-green shades. By treatment of the dyeings with aftertreating agents such as are conventional in textile dyeing, the wash-fastness thereof can be enhanced.

The following examples illustrate the invention, but are intended to limit the same. In these examples, the parts and percentages are by weight; the temperatures are in degrees centigrade.

EXAMPLE 1

29.6 parts of 4-nitro-4'-(2''-methyl-4''-amino-5''-methoxy)-phenylazo-stilbene-2,2'-disulfonic acid are dissolved, in the form of the sodium salt, in 1000 parts of warm water. The solution is cooled to 15° and the aminomonoazo dyestuff is then diazotized by the addition of an aqueous solution of 3.5 parts of sodium nitrite and 33 parts of 30% hydrochloric acid. The suspension of the diazo compound is run into a solution of 22.5 parts of the copper complex compound of 1-(2'-carboxy)-phenylazo-2,5-dihydroxynaphthalene-7-sulfonic acid, 60 parts of pyridine, 25 parts of 25% aqueous ammonia and 800 parts of water. Upon completion of the ensuing coupling, the obtained trisazo dyestuff is isolated and is subjected in conventional manner to demethylating coppering with ammoniacal copper oxide at 90° in aqueous solution in the presence of diethanolamine. The isolated and dried copper complex compound of the dyestuff corresponds to the formula

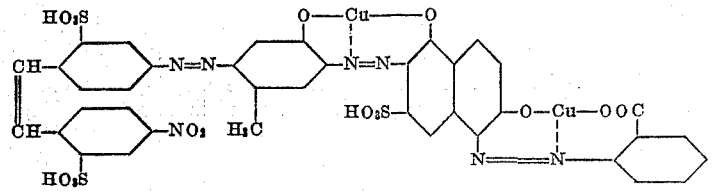

and is a dark powder which dissolves with gray-blue coloration in water and with greenish blue coloration in concentrated sulfuric acid, and dyes cotton and fibers of regenerated cellulose in fast greenish blue shades.

EXAMPLE 2

29.6 parts of the aminomonoazo dyestuff employed in Example 1 are diazotized after the manner set forth in such example. The suspension of the obtained diazo compound is run into a solution of 24.7 parts of the copper complex compound of 1-(2'-carboxy-4'-nitro)-phenylazo-2,5-dihydroxynaphthalene-7-sulfonic acid, 80 parts of pyridine base mixture, 25 parts of 25% aqueous ammonia and 600 parts of water. Upon completion of the ensuing coupling, the obtained trisazo dyestuff is isolated and is subjected in conventional manner to demethylating coppering with ammoniacal copper oxide at 90° in aqueous solution in the presence of pyridine base mixture. The copper complex compound is precipitated from the coppering solution by the addition of sodium chloride and is then filtered off and dried. It corresponds to the formula

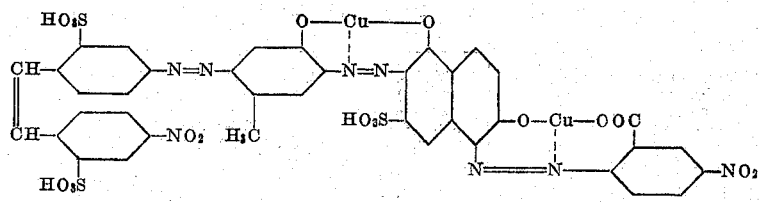

and is a dark powder which dissolves with blue-gray coloration in water and with greenish blue coloration in concentrated sulfuric acid. The dyestuff dyes cotton in light-fast gray shades.

EXAMPLE 3

29.6 parts of the aminomonoazo dyestuff used in Example 1 are diazotized as in that example. The suspension of the diazo compound is run into a solution of 25.1 parts of the copper complex compound of 1-(2'-hydroxy)-phenylazo - 2,5 - dihydroxynaphthalene - 4',7 - disulfonic acid, 60 parts of pyridine and 35 parts of 25% aqueous ammonia in 600 parts of water. Upon conclusion of the ensuing coupling, the obtained trisazo dyestuff is isolated and is subjected to demethylating coppering in conventional manner. In the dried state, the coppered dyestuff corresponds to the formula

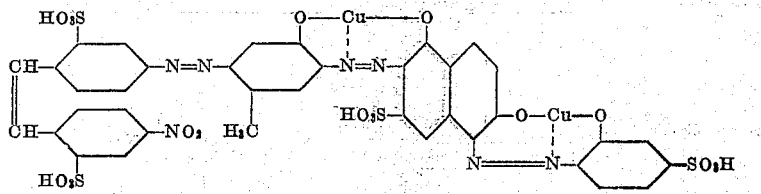

and is a dark powder which dissolves with greenish blue coloration in water and with blue-gray coloration in concentrated sulfuric acid, and dyes cotton in fast greenish blue shades.

EXAMPLE 4

29.6 parts of the aminomonoazo dyestuff used in Example 1 are diazotized according to the prescriptions of the said example. The suspension of the diazo compound is run into a solution of 27.6 parts of the copper complex compound of 1,5-dihydroxy-2-(2'-hydroxy)-naphthyl(1') - azonaphthalene - 4',7 - disulfonic acid and 30 parts of sodium carbonate in 1000 parts of water. Upon completion of the ensuing coupling, the trisazo dyestuff is isolated and is subjected to demethylating coppering in conventional manner. The obtained copper complex compound corresponds to the formula

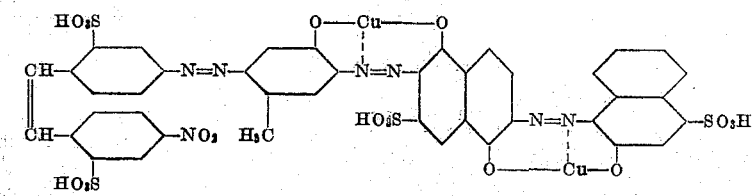

and, in the dried state, is a dark powder which dissolves with olive-green coloration in water and with brown-violet coloration in concentrated sulfuric acid, and dyes cotton in fast olive-green shades.

EXAMPLE 5

28 parts of 4-acetylamino-4'-(2''-methyl-4''-amino-5''-methoxy) - phenylazo - stilbene - 2,2' - disulfonic acid are diazotized after the manner described in Example 1. The obtained suspension of diazo compound is run into a solution of 27.6 parts of the azo component used in Example 4, 30 parts of sodium carbonate and 1000 parts of water. Upon completion of the ensuing coupling, the obtained trisazo dyestuff is isolated and subjected in conventional manner to demethylating coppering. The dried copper-containing dyestuff corresponds to the formula

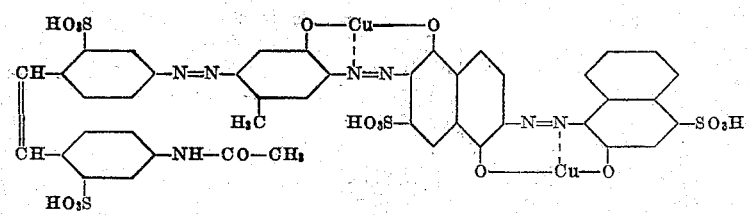

and is a dark powder which dissolves with olive-green coloration in water and with violet coloration in concentrated sulfuric acid, and dyes cotton in fast grayish olive shades.

Additional examples of dyestuffs according to the present invention, which can be prepared after the manner described in Examples 1–5, are set forth in the following table. These dyestuffs are characterized by their diazo and azo components and by the shade of the dyeings of their copper complex compounds on cotton.

TABLE

| Example No. (1) | Trisazo dyestuff Diazo component (2) | Trisazo dyestuff Azo component (3) | Color of copper complex compound on cotton (4) |
|---|---|---|---|
| 6 | 4-nitro-4'-(2"-methyl-4"'-amino-5"'-methoxy)-phenylazo-stilbene-2,2'-disulfonic acid. | Copper complex of 1-(2'-carboxy)-phenylazo-2,5-dihydroxynaphthalene-5',7'-disulfonic acid. | greenish blue. |
| 7 | ....do.... | Copper complex of 1-(2'-hydroxy)-naphthyl(1')-azo-2,5-dihydroxynaphthalene-4',7-disulfonic acid. | Do. |
| 8 | 4-nitro-4'-(3"-carboxy-4"'-amino)-phenylazo-stilbene-2,2'-disulfonic acid. | Copper complex of 1-(2'-carboxy-4'-nitro)-phenylazo-2,5-dihydroxynaphthalene-7-sulfonic acid. | gray. |
| 9 | 4-nitro-4'-(3"-methoxy-4"'-amino)-phenylazo-stilbene-2,2'-disulfonic acid. | ....do.... | Do. |
| 10 | 4-nitro-4'-(2",5"-dimethoxy-4"'-amino)-phenylazo-stilbene-2,2'-disulfonic acid. | ....do.... | Do. |
| 11 | 4-acetylamino-4'-(2"-methyl-4"'-amino-5"'-methoxy)-phenylazostilbene-2,2'-disulfonic acid. | ....do.... | Do. |
| 12 | 4-benzoylamino-4'-(2"-methyl-4"'-amino-5"'-methoxy)-phenylazo-stilbene-2,2'-disulfonic acid. | ....do.... | Do. |
| 13 | 4-nitro-4'-(2",5"-diethoxy-4"'-amino)-phenylazo-stilbene-2',2'-disulfonic acid. | Copper complex of 1,5-dihydroxy-2-(2'-hydroxy)-naphthyl(1')-azo-naphthalene-4',7-disulfonic acid. | olive-green. |
| 14 | 4-benzoylamino-4'-(2"-methyl-4"'-amino-5"'-ethoxy)-phenylazo-stilbene-2,2'-disulfonic acid. | ....do.... | grayish olive. |
| 15 | 4-nitro-4'-(3"-carboxy-4"'-amino)-phenylazo-stilbene-2,2'-disulfonic acid. | ....do.... | brownish olive. |
| 16 | ....do.... | Copper complex of 1-(2'-hydroxy)-naphthyl(1')-azo-2,5-dihydroxynaphthalene-4',7-disulfonic acid. | blue-gray. |
| 17 | 4-(1"',2"'-naphthylene)-triazole-4'-(3"-carboxy-4"'-amino)-phenylazo-stilbene-2,2',4"'-trisulfonic acid. | Copper complex of 1,5-dihydroxy-2-(2'-hydroxy)-naphthyl(1')-azo-naphthalene-4',7-disulfonic acid. | olive. |
| 18 | ....do.... | Copper complex of 1-(2'-carboxy-4'-nitro)-phenylazo-2,5-dihydroxynaphthalene-7-sulfonic acid. | greenish gray. |
| 19 | 4-acetylamino-4'-(2",5"-dimethoxy-4"'-amino)-phenylazo-stilbene-2,2'-disulfonic acid. | ....do.... | gray. |
| 20 | 4-(1"",2""-naphthylene)-triazole-4'-(3"-methoxy-4"'-amino)-phenylazo-stilbene-2,2',4"'-trisulfonic acid. | Copper complex of 1-(2'-carboxy-4'-nitro)-phenylazo-2,5-dihydroxynaphthalene-7-sulfonic acid. | olive-gray. |
| 21 | 4-(1"",2""-naphthylene)-triazole-4'-(2"-methyl-4"'-amino-5"'-methoxy)-phenylazo-stilbene-2,2',4"'-trisulfonic acid. | ....do.... | Do. |
| 22 | ....do.... | Copper complex of 1,5-dihydroxy-2-)2'-hydroxy)-naphthyl(1')-azo-naphthalene-4',7-disulfonic acid. | olive-green. |
| 23 | 4-nitro-4'-)4"-methoxy-3"'-amino)-phenylazo-stilbene-2,2'-disulfonic acid. | Copper complex of 1-)2'-carboxy-4'-nitro)-phenylazo-2,5-dihydroxynaphthalene-7-sulfonic acid. | dark brown. |
| 24 | 4-(1"",2""-naphthylene)-triazole-4'-)4"-methoxy-3"'-amino)-phenylazo-stilbene-2,2',4"'-trisulfonic acid. | ....do.... | Do. |
| 25 | 4-nitro-4'-)4"-methoxy-3"'-amino)-phenylazo-stilbene-2,2'-disulfonic acid. | Copper complex of 1,5-dihydroxy-2-(2'-hydroxy)-naphthyl(1')-azo-naphthalene-4',7-disulfonic acid. | dark green. |
| 26 | 4-nitro-4'-(2"-methyl-4"'-amino-5"'-methoxy)-phenylazo-stilbene-2,2'-disulfonic acid. | Copper complex of 1,5-dihydroxy-2-(1'-hydroxy)-naphthyl(2')-azo-naphthalene-3',6',7-trisulfonic acid. | olive. |
| 27 | 4-(1"",2""-naphthylene)-triazole-4'-(2"-methyl-4"'-amino-5"'-methoxy)-phenylazo-stilbene-2,2',4"'-trisulfonic acid. | ....do.... | olive-green. |
| 28 | 4-nitro-4'-(2"-acetylamino-4"'-amino-5"'-methoxy)-phenylazo-stilbene-2,2'-disulfonic acid. | Copper complex of 1-(2'-carboxy-4'-nitro)-phenylazo-2,5-dihydroxynaphthalene-7-sulfonic acid. | gray. |
| 29 | 4-acetylamino-4'-(2"-acetylamino-4"'-amino-5"'-methoxy)-phenylazo-stilbene-2,2'-disulfonic acid. | ....do.... | Do. |
| 30 | 4-nitro-4'-(2"-propionylamino-4"'-amino-5"'-methoxy)-phenylazo-stilbene-2,2'-disulfonic acid. | ....do.... | Do. |

EXAMPLE 31

29.6 parts of the aminomonoazo dyestuff employed in Example 1 are diazotized after the manner set forth in such example. The suspension of the obtained diazo compound is run into a solution of 24.5 parts of the nickel complex compound of 1-(2'-carboxy-4'-nitro)-phenylazo-2,5-dihydroxynaphthalene-7-sulfonic acid, 70 parts of pyridine base mixture, 30 parts of 25% aqueous ammonia and 500 parts of water. Upon completion of the ensuing coupling, the obtained trisazo dyestuff which contains 1 atom of nickel is precipitated by the addition of sodium chloride and is then filtered off. It is dissolved in 1000 parts of hot water, and 100 parts of diethanolamine, 25 parts of 25% aqueous ammonia and an aqueous solution of 15 parts of crystallized nickel sulfate are added. The mixture is then heated for some hours at 95°. The obtained trisazo dyestuff which contains 2 atoms of nickel in complex binding is precipitated by the addition of sodium chloride and is then filtered off and dried. It corresponds to the formula.

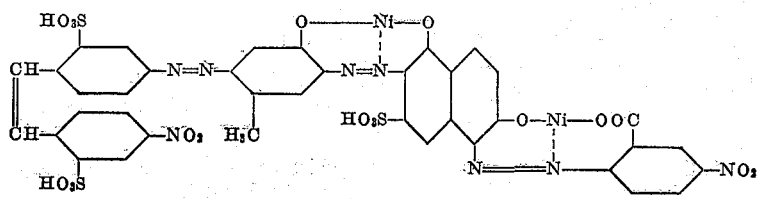

and is a dark powder which dissolves with blue-gray coloration in water and with greenish blue coloration in concentrated sulfuric acid. The dyestuff dyes cotton and fibers of regenerated cellulose in light-fast gray shades.

EXAMPLE 32

The trisazo dyestuff which is obtained after the manner set forth in Example 31, containing 1 atom of nickel is dissolved in 1000 parts of hot water, 50 parts of diethanolamine and 31 parts of 25% aqueous ammonia. After addition of an aqueous solution of 12.5 parts of crystallized copper sulfate the mixture is heated for several hours at 90°. The obtained copper-nickel complex compound is precipitated by the addition of sodium chloride and is then filtered off and dried. It corresponds to the formula

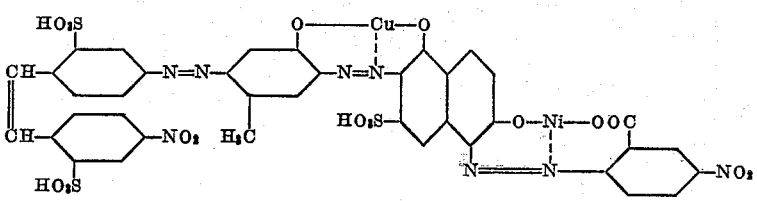

and is a dark powder which dissolves with blue-gray coloration in water and with bluish green coloration in concentrated sulfuric acid. The dyestuff dyes cotton and fibers of regeneration cellulose in light-fast gray shades.

EXAMPLE 33

The trisazo dyestuff which is obtained after the manner set forth in Example 2, and which contains 1 atom of copper is treated with nickel sulfate after the manner set forth in Example 31. The thus obtained nickel-copper complex compound corresponds to the formula

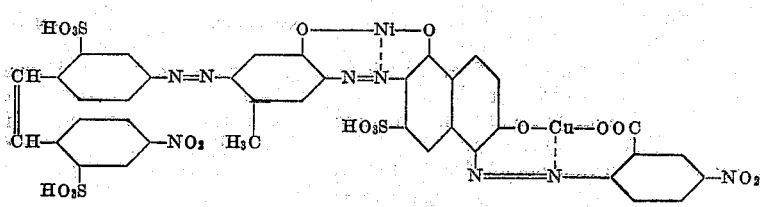

and is, in the dry state, a dark powder which dissolves with blue-gray coloration in water and with greenish-blue coloration in concentrated sulfuric acid. The dyestuff dyes cotton in light-fast gray shades.

EXAMPLE 34

If the trisazo dyestuff which is obtained after the manner set forth in Example 11 and which contains 1 atom of copper is treated with nickel sulfate, diethanolamine and ammonia after the manner set forth in Example 31, there is obtained a nickel-copper complex compound which corresponds to the formula

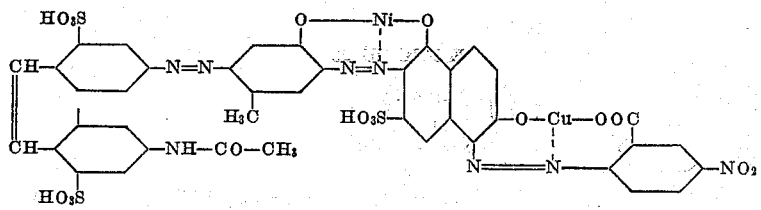

In the dry state the dyestuff is a dark powder which dissolves with grayish-blue coloration in water and with greenish-blue coloration in concentrated sulfuric acid. It dyes cotton in light-fasct gray shades.

The dyestuffs of Examples 8, 15, 16, 17 and 18 may be used for dyeing in the form of their complex compounds containing only one atom of copper and can then be aftercoppered on the fiber according to per se conventional methods. It is also possible to replace in the above cited examples the copper complex compounds used as azo components by the respective nickel complex compounds or by the metal-free compounds. With the thus prepared dyestuffs there are obtained the same shades,

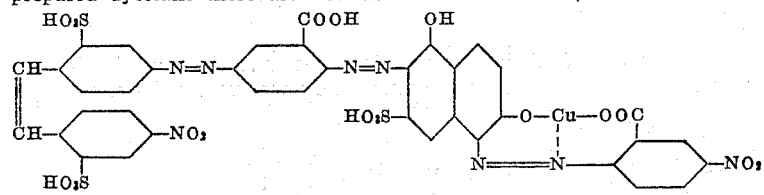

when aftercoppered on the fiber, as with the metal complex compounds which contain two atoms of copper or nickel or one atom of copper and one atom of nickel.

Representative examples are 11, 19, 22 and 23. The formulae of the thus-obtained dyestuffs are:

EXAMPLE 11

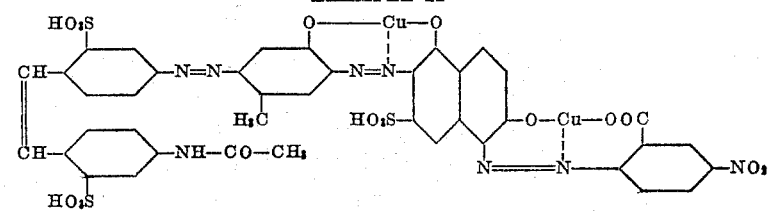

EXAMPLE 19

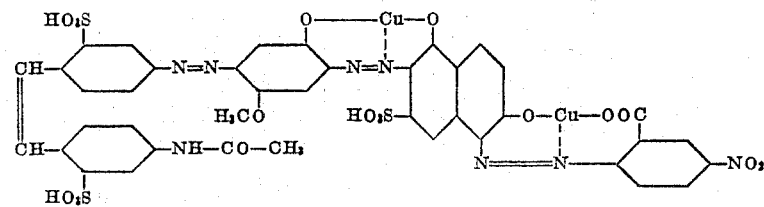

EXAMPLE 22

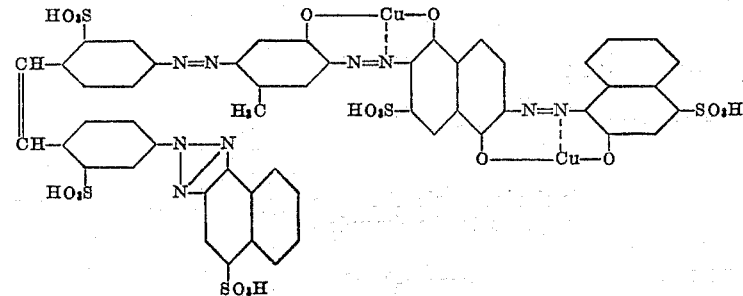

EXAMPLE 23

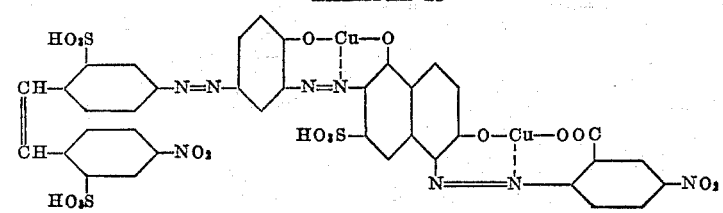

EXAMPLE 35

The trisazo dyestuff which is obtained, after the manner set forth in Example 2, by coupling diazotized 4-nitro-4'-(3''-carboxy-4''-amino)-phenylazo-stilbene-2,2' - disulfonic acid with 1-(2'-carboxy-4'-nitro)-phenylazo-2,5-dihydroxynaphthalene-7-sulfonic acid, which trisazo dyestuff corresponds to the formula dyes cotton and fibers of regenerated cellulose by the aftercoppering process in light-fast gray shades.

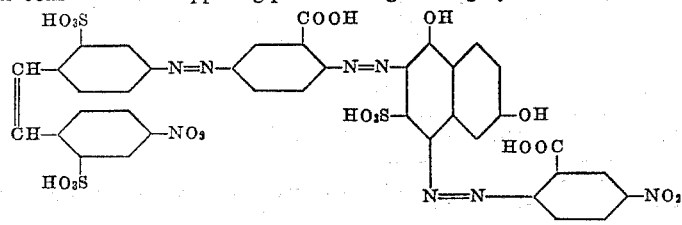

The trisazo dyestuff which contains one atom of copper and which corresponds to the formula obtained from the diazo component of the preceding paragraph and the copper complex compound of the azo component of the preceding paragraph, also yields valuable gray shades on cotton and fibers of regenerated cellulose by the aftercoppering process.

EXAMPLE 36

A dyebath consisting of 3000 parts of softened water and a solution of 0.5 part of the dyestuff according to Example 2 in 20 parts of hot water is charged, at 30° with 100 parts of wetted cotton. After the addition of 5 parts of sodium sulfate, the dyebath is heated to 100° in the course of 30 minutes, 5 additional parts of sodium sulfate being added at 50° and also at 70°. The dyeing is continued for 15 more minutes at 100°, after which five more parts of sodium sulfate are added and the bath allowed to cool. At 50°, the cotton is withdrawn, thoroughly rinsed with cold water and dried at 60°. The cotton is dyed a neutral gray shade of very good fastness to light.

The fastness to washing of this dyeing can be improved by aftertreatment with a copper-containing polyalkylenepolyamine. For this purpose, an aftertreating bath is prepared from 3000 parts of water and 1 part of a copper-containing polyalkylenepolyamine. The dyed and rinsed cotton is introduced into the bath and is treated therein for 30 minutes at 70°. The cotton is then withdrawn, rinsed with cold water and dried at 60°. The dyeing, which is now somewhat more greenish in shade, is of very good fastness to light and excellent fastness to washing.

Having thus disclosed the invention, what is claimed is:

1. A trisazo dyestuff which corresponds to the formula

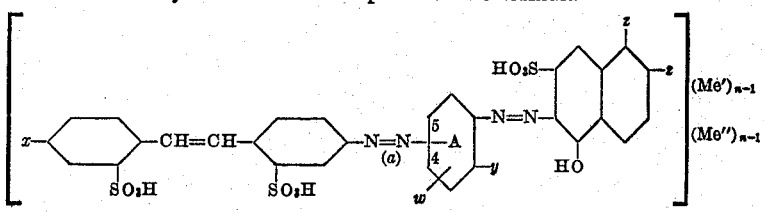

wherein $x$ stands for a member selected from the group consisting of a nitro, carboxyacylamino and naphthylene triazole group, $y$ stands for a member selected from the group consisting of a carboxyl, methoxy and ethoxy group, one $z$ stands for hydroxy, and the other $z$ stands for an —azo—R residue, R being a mono- to bi-nuclear carbocyclic aryl radical which contains in the ortho-position respective to —azo— a member selected from the group consisting of a hydroxy, carboxy, methoxy and ethoxy group, $w$ stands for a member selected from the group consisting of hydrogen, lower alkyl, lower alkoxy and carboxyacylamino, each of Me′ and Me″ stands for a metal selected from the group consisting of copper and nickel, $n$ stands for one of the numerals 1, 2 and 3, and wherein the —N=N— group indexed ($a$) is in one of the positions 4 and 5 of the nucleus A.

2. The copper-containing trisazo dyestuff which corresponds to the formula

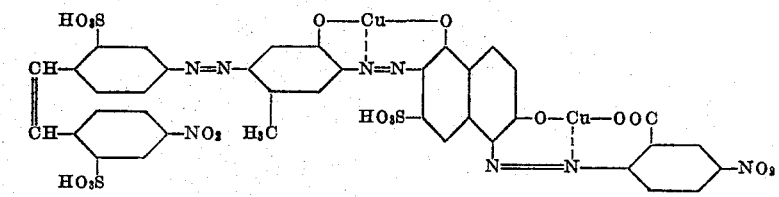

3. The copper-containing trisazo dyestuff which corresponds to the formula

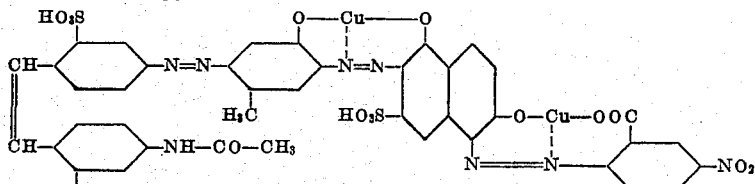

4. The copper-containing trisazo dyestuff which corresponds to the formula

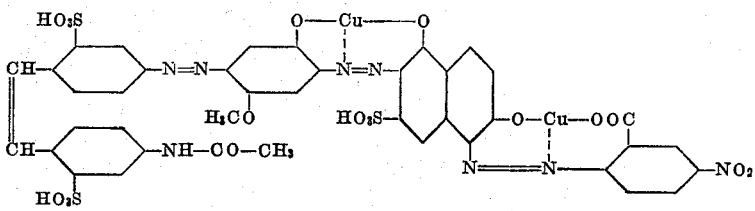

5. The copper-containing trisazo dyestuff which corresponds to the formula

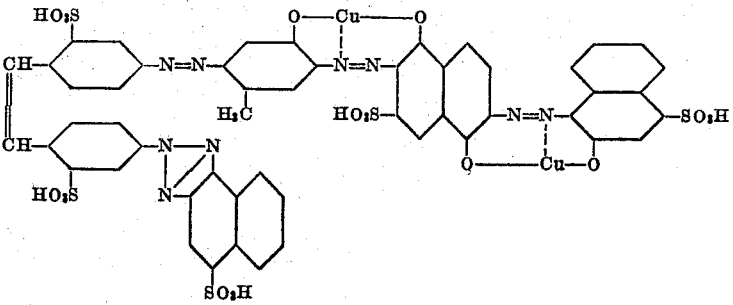

6. The copper-containing trisazo dyestuff which corresponds to the formula
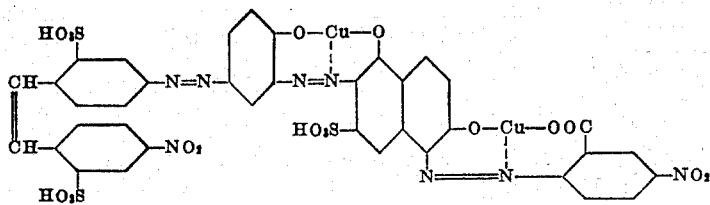
References Cited in the file of this patent
UNITED STATES PATENTS
| | | |
|---|---|---|
| 2,192,153 | Roas | Feb. 27, 1940 |
| 2,197,350 | Schindhelm et al. | Apr. 16, 1940 |
| 2,394,998 | Keller | Feb. 19, 1946 |